April 18, 1950 — N. E. WAHLBERG ET AL — 2,504,285
GEAR SELECTING MECHANISM
Filed June 9, 1945 — 2 Sheets-Sheet 1
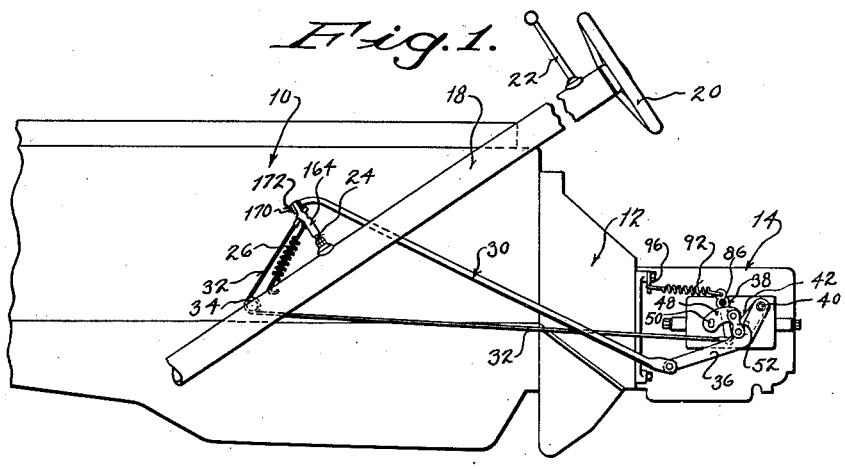
Fig. 1.
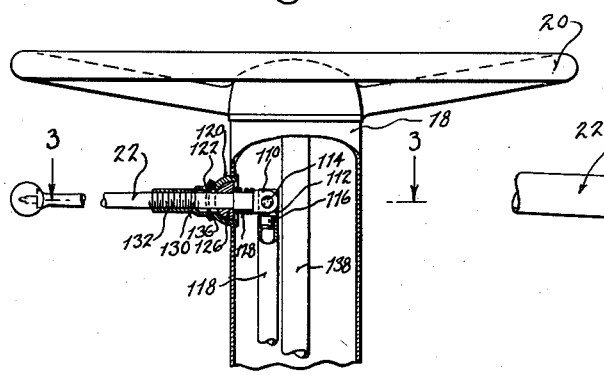
Fig. 2.
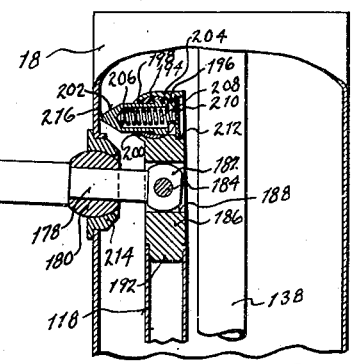
Fig. 5.
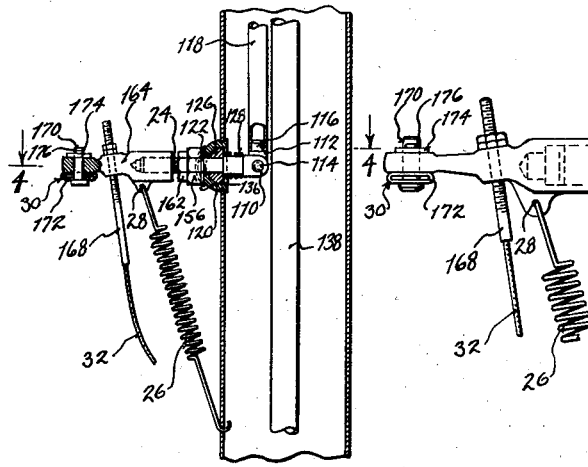
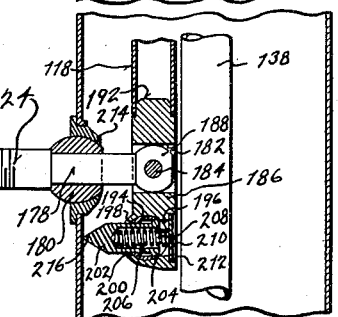
INVENTOR
NILS ERIK WAHLBERG
JOSEPH F. SLADKY
BY Carl J. Barbee
HIS ATTORNEY

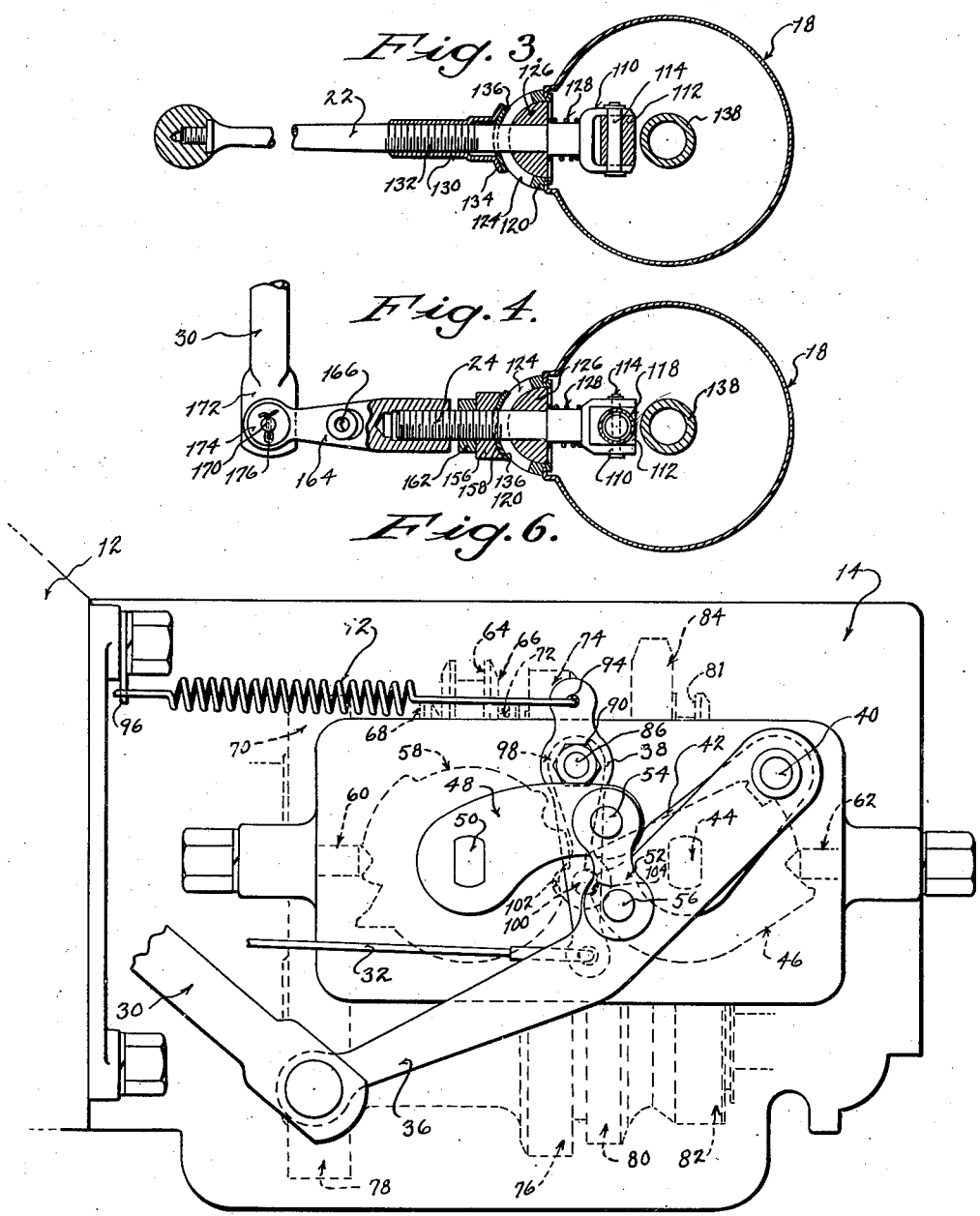

Patented Apr. 18, 1950

2,504,285

UNITED STATES PATENT OFFICE 2,504,285

GEAR SELECTING MECHANISM

Nils Erik Wahlberg, Chicago, Ill., and Joseph F. Sladky, Racine, Wis., assignors to Nash-Kelvinator Corporation, Kenosha, Wis., a corporation of Maryland Application June 9, 1945, Serial No. 598,512

12 Claims. (Cl. 74—473)

This invention relates to gear selecting mechanisms and more particularly to manually controlled means which utilize a single link as a connection with the gear selecting mechanism of the transmission.

It is an object of this invention to provide a manually controlled gear selecting mechanism which will have most of its parts concealed.

It is another object of this invention to provide a manually controlled gear selecting mechanism which will require a minimum of effort to operate.

It is a further object of this invention to provide a manually controlled gear selecting mechanism which will not rattle or jiggle under normal conditions.

It is a further object of this invention to provide a manually controlled gear selecting mechanism which will require no lubrication after assembly and no adjustment when used under normal conditions.

Other objects and advantages of this invention will be apparent from a consideration of the following description, claims and attached drawings, of which there are two sheets, and in which:

Figure 1 is a side elevation of an internal combustion engine, clutch housing, transmission case with gear shifting means attached thereto and the steering mechanism to which parts of the invention are secured;

Figure 2 is a side elevation of the steering column, partially cut away, showing one form of that portion of the invention secured thereto;

Figure 3 is a sectional view taken along lines 3—3 of Figure 2 and looking in the direction of the arrows;

Figure 4 is a sectional view taken along lines 4—4 of Figure 2 and looking in the direction of the arrows;

Figure 5 is a sectional view similar to Figure 2 showing another form of a portion of the invention; and Figure 6 is an enlarged side elevation of the transmission case showing the gear selecting mechanism mounted on the outside thereof and several cooperating mechanisms within.

Illustrated in Figure 1 is an internal combustion engine 10, clutch housing 12 and transmission case 14. In relative position to said engine 10 is shown steering column 18 with the ordinary hand wheel 20 mounted on its upper end. Projecting from column 18 directly below wheel 20 is hand shift lever 22 and near the lower end of column 18 is shown a shift lever 24 projecting from within said column. One end of the tension spring 26 is hooked in an aperture in column 18 at a point below lever 24 and has its other end hooked in an eye 28 (Figures 2 and 5) in extension 164 of lever 24, thus tending to pull lever 24 downwardly along the axis of column 18.

Near the outer end of extension 164 is secured a shift rod 30 and also a flexible cable 32 which runs over a pulley 34 secured to column 18 below lever 24. Rod 30 and cable 32 have their other ends operatively secured to external shifting elements on the side of transmission 14 to impart gear selecting movement from lever 24 to said elements.

Referring to Figure 6, which is an enlarged view of transmission 14 showing the external elements referred to above and also several of the parts within said transmission, it will be noted that rod 30 forms a linkage between extension 164 of lever 24 (Figure 1) and one end of lever 36. Cable 32 forms a linkage between extension 164 of lever 24 (Figure 1) and lever 38 on the side of the transmission. The other end of lever 36 is rotatably secured to pin 40 which is carried by lever 42 remote from shaft 44 on which lever 42 is secured. Shaft 44 is rotatable and extends into the transmission case where it has speedfinder means 46 secured thereto and on its innermost end a shift fork (not shown) is carried in such a manner that it is moved forward or backward as shaft 44 is rotated.

Lever 36 is connected to lever 48, which is secured on rotatable shaft 50, by a link 52. Link 52 is rotatably secured to lever 48 by a pin 54 secured on the end of lever 48 remote from shaft 50. Pin 54 extends through one end of link 52. A similar pin 56 is rotatably secured near the midpoint of lever 36 and extends through the other end of link 52. Thus if lever 42 is held immovable, a pushing movement of lever 36 by link 30 will rotate lever 48 in a clockwise direction and in a counterclockwise direction if link 30 is pulled forwardly. If lever 48 is held immovable, a rearward push of link 30 will rotate lever 36 around the axis of pin 56 in a counterclockwise direction and thus rotate lever 42 in a like direction around the axis of shaft 44. If link 30 is pulled forwardly, lever 36 and lever 42 will be rotated in a clockwise direction.

Speedfinder means 58 are rigidly secured on shaft 50 inside the transmission 14 and a shift fork (not shown) is carried on the inner end of shaft 50 in such a manner that counterclockwise rotation of said shaft will move the shift fork rearwardly and clockwise rotation of shaft 50 will move said fork forwardly. A spring-loaded poppet 60 is slidably retained in the transmission case and has its outer end designed to engage grooves in the outer surface of speedfinder means 58 to restrain rotation of said speedfinder means. Similar poppet means 62 are positioned in a like manner to restrain rotation of speedfinder means 46 of shaft 44.

The shift fork (not shown) which is carried and is movable by shaft 50 is partially positioned within groove 64 of synchronizer collar 66. Collar 66 is in constant engagement with the driven shaft (not shown) of the transmission and is also shiftable in a forward direction by the said shift fork which is carried on the inner end of shaft 50 so that its toothed inner surface will engage gear 68, which is integral with drive gear 70 and formed on the drive shaft. Thus collar 66 and the driven shaft are driven in direct or "high" gear. Collar 66 likewise may be moved rearwardly to surround and engage gear 72 which forms a part of second speed gear 74 and in this manner collar 66 and the driven shaft are driven as gear 74 is in constant engagement with gear 76, which is one of the gear elements of the integral gear train composed of gears 78, 76, 80 and 82. Gear 78 is in constant engagement with drive gear 70; thus the abovementioned gear train rotates whenever gear 70 rotates.

The shift fork (not shown) on the inner end of shaft 44 has a portion positioned within groove 81 formed on the side of gear 84 which is slidable on a splined portion of the driven shaft of the transmission. When shaft 44 is rotated by lever 42 in a counterclockwise direction, the shift fork will be moved forwardly and, having a portion positioned within groove 81, the fork will move gear 84 into engagement with gear 80 and be driven thereby, imparting rotating movement to the driven shaft. When shaft 44 is rotated in a clockwise direction, gear 84 will be moved rearwardly to engage an idler gear (not shown) which is in constant engagement with gear 82, thus transmitting reverse rotative force to the driven shaft.

As described hereinbefore, it is necessary to lock either shaft 44 or 50 so that the other may be rotated by manual rotation of lever 36. These shafts become selectively immovable by the interlock device comprised of rotatable shaft 86 extending from within transmission 14 and having a lever 38 secured thereon near its outer end by nut 90 threaded thereon. To one end of lever 38 remote from shaft 86 is secured cable 32 which pulled by extension 164 of lever 24 (Figure 1) to rotate lever 38 in a clockwise direction. A tension spring 92 has one of its ends hooked through an aperture 94 in the other end of lever 38 remote from shaft 86. The other end of tension spring 92 is secured to a plate 96 secured near the front of transmission 14, spring 92 thus tending to rotate lever 38 in a counterclockwise direction.

On the inner end of shaft 86 is secured a second lever 98 which carries a pin 100 which engages groove 102 of speedfinder means 58 as cable 32 is pulled, rotating lever 38, shaft 86 and lever 98 in a clockwise direction. In this manner, means 58, shaft 50 and lever 48 are held immovable. When cable 32 is slackened, spring 92 rotates lever 38, shaft 86 and lever 98 in a counterclockwise direction and pin 100 moves into groove 104 of speedfinder means 46, which is secured to shaft 44. Thus shaft 44 and lever 42 are held immovable.

The operator may select the desirable gear by employing the conventional H shifting movements. If he wishes to engage first ("low") gear, he will move hand lever 22 of Figure 1 upwardly toward wheel 20 and rotate lever 22 in a clockwise direction, which will move lever 24 in a like manner, pulling cable 32 which rotates lever 38 in a clockwise direction, locking shaft 50 as described above. Link 30 will be pushed rearwardly, rotating lever 36 in a counterclockwise direction to rotate lever 42 and shaft 44 to move gear 84 into engagement with gear 80 as described hereinbefore.

If the operator wishes to engage reverse gear, lever 22 is rotated counterclockwise from the raised position and link 30 will be pulled forwardly, rotating lever 36, lever 42 and shaft 44 in a clockwise direction, moving gear 84 into engagement with the idler gear which is in engagement with gear 82 at all times.

When the operator wishes to engage second or "high" gear, he will move lever 22 from neutral position downwardly away from wheel 20, thus moving lever 24 in a like manner, which slackens cable 32, permitting spring 92 to rotate lever 38, shaft 86 and lever 98 in a counterclockwise direction, thereby locking shaft 44 and lever 42 in a fixed position as described above. If lever 22 is rotated in a clockwise direction from this lower position, lever 24 will move in the same manner, pushing link 30 and moving lever 36 to rotate shaft 50 in a clockwise direction, which shifts collar 66 to engage the drive gear 68 as described hereinbefore. When link 30 is pulled as lever 22 is rotated in a counterclockwise direction from its lowered position, lever 36 will be rotated in a clockwise direction and collar 66 will engage second gear 72 as previously described. In this manner, the operator may select the usual four gear ratios.

The inventors have developed a novel arrangement of a shifting mechanism carried by the steering column 18 as shown in Figures 2, 3, 4 and 5 which imparts movement to the above described transmission shifting units.

Illustrated in Figure 2 is one form of applicants' arrangement showing the hand lever 22 and lever 24 extending into steering column 18. Lever 22 is located directly under hand wheel 20 and lever 24 is located near the lower end of column 18. Said levers are mounted on column 18 and pivotally connected at their inner ends, defining a clevis 110, to tube 118 by fixtures 112 which are secured to clevis 110 by pins 114 and have portions 116 secured in the ends of tube 138.

Levers 22 and 24 extend into the inside of steering column 18 through semi-spherical members 120 which are rigidly secured within apertures in the side of column 18. Said semi-spherical members have annular grooves positioning said members in the apertures of column 18. Levers 22 and 24 extend through slots 122 in members 120 which run longitudinally of the axis of column 18. It will be noted that slots 122 are slightly longer than the diameters of levers 22 and 24, thereby permitting the operator to move levers 22 and 24 toward and away from hand wheel 20.

It will be noted in referring to Figures 3 and 4 that members 120 also have slots 124 in a plane which bisects the axis of column 18 at right angles. Slots 124 are much greater than the diameters of levers 22 and 24, thereby allowing the operator to move said levers in a plane which is transverse to the longitudinal axis of column 18. In this manner, levers 22 and 24 may be moved in the conventional H-shaped manner as each member 120 has two slots 124 which are connected at the midpoints thereof by a single slot 122.

Surrounding levers 22 and 24 and of the same contour as the inner walls of semi-spherical members 120 are oilite bearings 126 which are held against the inner walls of members 120 by compression springs 128, said springs being compressed between bearings 126 and the shoulders of clevis 110. Springs 128 have dual purposes in as much as they hold bearings 126 as described and also tend to pull levers 22 and 24 within column 18. Upper spring 128 is prevented from pulling lever 22 wholly within column 18 by the nut-like internally threaded sheath 130 which is turned on threaded portion 132 of lever 22 and the nut 156, which is threaded on lever 24 and has its one face 158 (Figure 4) shaped to fit the outer contour of lower member 120, holds lever 24 from being pulled within column 18. Lock nut 162 is threaded on lever 24 to hold nut 156 thereon.

The inner end of sheath 130 is defined by semi-spherical flange 134 (Figure 3) having the same contour as the outer surface of member 120. Bearing member 136 is interposed between the flange 134 and member 120 and a like member 136 is interposed between nut 156 and member 120 of lever 24. In this manner flange 134 and nut 156 will slide over the outer surfaces of members 120 as levers 22 and 24 are moved within slots 122 and 124. Sheath 130 and nut 156 are turned on levers 22 and 24, respectively, a predetermined distance to space tubular link 118 from steering shaft 138 which extends through the center of column 18.

An extension member 164 is loosely threaded on the outer end of lever 24. An aperture 166 (Figure 4) is defined in extension 164 through which extends a threaded pin 168 (Figure 2) secured to the end of flexible cable 32. A nut and lock nut are threaded on the upper end of pin 168 to prevent said pin from being pulled downwardly out of aperture 166. A bolt 170 extends through an aperture in the end 172 of link 30 and through an aperture in the outer end of extension 164. A washer 174 is positioned around the end of bolt 170 and a cotter key 176 (Figure 4) is secured through an aperture on the end of bolt 170, thus securing extension 164 and link 30 together.

In Figure 5 a modification of applicants' arrangement is illustrated whereby levers 22 and 24 have reduced portions 178 which extend through balls 180 to the inside of post 18. Balls 182 are secured on the inner ends of portions 178 by pins 184. Pins 184 are secured in fixtures 186, holding the inner ends of levers 22 and 24 and balls 182 within apertures 188 which extend through fixtures 186. Tube 118 has its upper end positioned around and secured to the plug-like ends 192 of fixtures 186 as said tube is secured to portions 116 of Figure 2. Cores 194 are rotatably positioned within cylindrical apertures in the outer ends of fixtures 186. Cores 194 have transverse apertures 196 extending therethrough which have reduced portions 198.

Positioned within apertures 196 and extending therefrom through slots 200 of fixtures 186 are plungers 202. Plungers 202 have flanged portions 204 which abut the reduced portions 198, thereby limiting the distance plungers 202 may travel through apertures 196. Plungers 202 have longitudinal bores 206 in which are positioned compression springs 208. "Welch" plugs 210 are inserted within enlarged portions 212 of apertures 196, thereby forming stoppers for one end of compression springs 208. The other ends of springs 208 abut the inner end of bores 206.

It will be understood that springs 208 will force plungers 202 through apertures 196 to the inner walls of column 18 and thus tend to force fixtures 186 away from the walls of column 18 toward the center thereof. As this is done, levers 22 and 24, by the pins 184 securing the same to fixtures 186, will be pulled inwardly of column 18, thereby seating balls 180 within sockets 214 which are positioned within apertures in column 18. In this manner the balls 180 which are positioned around the reduced portions 178 of lever 22 will be at all times firmly seated within the sockets 214, thereby preventing any rattles or jiggles due to vibrations. As lever 22 is moved longitudinally of column 18, fixtures 186 will be moved upwardly and downwardly. However, the pointed ends 216 of plungers 202 which engage the inner walls of column 18 will remain fixed as slots 200 are longer than the diameter of plungers 202, thereby permitting the ends 216 of plungers 202 to remain fixed as the remaining portions of said plungers oscillate.

Assembly of the arrangements carried by the steering column 18 consists of assembling the levers 22 and 24 and the cooperating ball and socket means in operating condition and then securing the linkage means to the inner ends of said levers, followed by insertion of the steering shaft 138 into column 18.

While we have described our invention in some detail, we intend this description to be an example only and not as a limitation of our invention, to which we make the following claims:

1. A gear selecting mechanism for a power transmission, a plurality of movable elements therein, external means associated therewith for shifting the same, control means for actuating said external means comprising a steering column, a hand wheel mounted on the upper end of said column, a hand lever extending within said column near the upper end thereof, a second lever extending into said column near its lower end, a link secured to and extending between the inner ends of said levers, resilient means positioned between said link and the inner walls of said column constantly urging said link toward the center of said column, and means connecting said second lever to said external means on the side of the transmission.

2. A gear selecting mechanism for a power transmission, a plurality of movable internal elements in said transmission, external means associated therewith for shifting said internal elements, control means for said external means comprising a steering column, a hand lever extending from within said column near the upper end thereof, a second movable lever extending from within said column near the lower end thereof, a rigid link connecting the inner ends of said levers and pivotally secured thereto for imparting movement of said hand lever to said second lever, resilient means constantly urging said levers inwardly of said column, and link means connecting said second lever and the external means of the transmission.

3. A gear selecting mechanism for a power transmission comprising movable means on said transmission, a tubular steering column, a hand lever extending from within said column near the upper end thereof, a second lever extending from within said column near the lower end thereof, apertures in the walls of said column through which said levers extend, ball and socket means secured within said apertures forming a movable connection between said levers and said column, a link connecting the inner ends of said levers and pivotally secured thereto, resilient means urging said levers inwardly of the column, and link means connecting said second lever with the movable means on said transmission.

4. In a gear selecting mechanism for a power transmission of a vehicle, shifting means for said transmission, a steering column, a hand lever extending from within said column near the upper end thereof, a second lever extending from within said column near the lower end thereof, a pair of apertures in the walls of said column through which said levers extend, ball and socket means secured in said apertures positioning said levers therein and forming a movable connection between said levers and said column, resilient means urging said levers inwardly, a link pivotally connected to the inner ends of said levers to form a connection therebetween, and linkage elements secured to the second lever and the shifting means for the transmission forming a connection therebetween for transmitting motion to said shifting means.

5. In a gear selecting mechanism for a power transmission of a vehicle, shifting means for said transmission, a steering column, an aperture in said column near its upper end, an aperture in said column near its lower end, ball and socket means secured in each of said apertures, a hand lever extending from within said column through an aperture in one element of the ball and socket means positioned in the upper aperture in the column and secured to said one element, a second lever extending from within said column through an aperture in one element of the ball and socket means in the lower aperture in the column and secured to said one element, a link pivotally secured at its ends to the inner ends of said levers, resilient means positioned between said link and the inner walls of said column for urging the levers and link inwardly to hold the ball and socket means in assembled condition, and means secured to said second lever and the shifting means for the transmission forming a connection therebetween.

6. In a gear selecting mechanism for a power transmission of a vehicle, external movable elements on said transmission, a tubular steering column, a pair of apertures in said column, one near the upper end and one near the lower end thereof, socket means secured in each of said apertures, a hand lever extending from within said column through said upper aperture, a ball means secured around said hand lever, a second lever extending from within said column through said lower aperture, a second ball means secured around said second lever, a link positioned between the inner ends of said levers and pivotally secured thereto, resilient means positioned between said link and the inner wall of said column urging said link toward the center of said column and thereby positioning said ball means in engagement with said socket means, and means secured to said second lever and said external elements on the transmission forming a linkage therebetween.

7. In a gear selecting mechanism for a power transmission of a vehicle, external shiftable means on said transmission, a steering column, a pair of longitudinally spaced apertures in said column, ball and socket means secured in each of said apertures, a hand lever extending within said column through an aperture in one of said ball and socket means and secured thereto, a second lever extending within said column through an aperture in the other ball and socket means and secured thereto, a link having its ends pivotally secured to the inner ends of said hand lever and said second lever, resilient means positioned between the ends of said link and the inner wall of said column to move said link toward the center of said column to maintain the ball and socket means in operative condition, a fixture loosely threaded on the outer end of said second lever for rotation around the axis thereof, and connecting means secured to said fixture and the external shiftable means on said transmission forming a linkage therebetween.

8. In a gear selecting mechanism for a transmission of a vehicle, shifting means carried by said transmission, a steering column, an aperture near the upper end of said column, a second aperture near the lower end of said column, partially ball-shaped elements secured in each of said apertures, a pair of slots in each of said elements extending longitudinally of the column and spaced apart, a second slot in each of said elements joining said first slots near the midpoints thereof to form an H-shaped aperture in each of said ball-shaped elements, a pair of levers extending into said column through the H-shaped apertures in the ball-shaped elements and movable therein, socket means to engage said ball-shaped elements threaded onto each of said levers, a partially ball-shaped bearing positioned around each of said levers and in engagement with the inner walls of said ball-shaped elements, an enlarged inner end on each of said levers, resilient means positioned around said levers between said bearing and said inner ends of said levers for holding said socket means in engagement with the outer surfaces of said ball-shaped elements and for holding said bearing in engagement with the inner surfaces of said ball-shaped elements, a link extending between said inner ends of said levers and pivotally secured thereto, a fixture loosely threaded on one of said levers, and means forming a linkage between said fixture and the shifting means carried by the transmission.

9. In a gear selecting mechanism for a power transmission of a vehicle, external shifting means on said transmission, a steering column for said vehicle, a first partially ball-shaped element secured within an aperture near the upper end of said column, a second partially ball-shaped element secured within a second aperture in said column near the lower end thereof, an H-shaped aperture in each of said partially ball-shaped elements, a hand lever extending to the inside of said column through the aperture in said first ball-shaped element and movable therein, a second lever extending to the inside of said column through the aperture in said second ball-shaped member and movable therein, socket means carried by each of said levers in engagement with the outside periphery of said ball-shaped members and movable thereover by said levers, a partially ball-shaped bearing positioned within each ball-shaped element surrounding those inner portions of said levers positioned therein, a link extending between the inner ends of said levers, connection means securing said link to the ends of said levers, resilient means positioned between the said bearings and the said connection means of each lever, and means forming a linkage between said second lever and the shifting means on the transmission.

10. In a gear selecting mechanism for a power transmission for a vehicle, shifting means carried by said transmission, a steering column for said vehicle, a hand lever extending laterally into said column near its upper end, a first ball and socket means carrying said hand lever, a second lever extending into said column near its lower end, a second ball and socket means carrying said second lever, a connection means for each of said levers and said column formed by the ball element of each ball and socket means being secured to said column and one of the socket means being secured around each of said levers, an H-shaped aperture in each of said ball elements through which said levers extend, thereby permitting movement of said levers, a link extending between the inner ends of said levers and pivotally secured thereto, resilient means for pulling said levers inwardly and thereby holding said socket elements in engagement with the outer periphery of said ball elements, an extension member loosely threaded on the outer end of said second lever, and linkage means connecting said extension member with the shifting means of the transmission.

11. In a gear selecting mechanism, a cylindrical support means, spaced apertures formed in said support means, a pair of levers each extending through one of said apertures, a connection means between the ends of said levers, and means for mounting said levers in said apertures and permitting reciprocation of said levers.

12. In a gear selecting mechanism, a cylindrical column, a pair of levers extending through spaced apertures formed in said column, a connection means extending between the ends of said levers within said column, and connection means reciprocally associating said levers with said column adjacent the apertures.

NILS ERIK WAHLBERG.
JOSEPH F. SLADKY.

REFERENCES CITED

The following references are of record in the file of this patent:

UNITED STATES PATENTS

| Number | Name | Date |
|---|---|---|
| 1,483,458 | Kummer | Feb. 12, 1924 |
| 1,821,942 | Marles | Sept. 8, 1931 |
| 2,205,589 | Bixby | June 25, 1940 |
| 2,235,975 | Best | Mar. 25, 1941 |
| 2,237,507 | Shreffler | Apr. 8, 1941 |
| 2,275,779 | MacPherson | Mar. 10, 1942 |
| 2,299,889 | Fishburn | Oct. 27, 1942 |
| 2,303,787 | Burd | Dec. 1, 1942 |
| 2,324,732 | Slack | July 20, 1943 |
| 2,381,773 | Rainsford | Aug. 7, 1945 |

OTHER REFERENCES

Product Engr.; issue of November 1939, page 471.